United States Patent
Konno

(10) Patent No.: US 9,678,234 B2
(45) Date of Patent: Jun. 13, 2017

(54) MULTI-LEVEL SEISMIC SOURCE AND METHOD

(71) Applicant: CGG SERVICES SA, Massy (FR)

(72) Inventor: Junya Konno, Massy (FR)

(73) Assignee: CGG SERVICES SAS, Massy (FR)

( * ) Notice: Subject to any disclaimer, the term of this patent is extended or adjusted under 35 U.S.C. 154(b) by 504 days.

(21) Appl. No.: 14/102,882

(22) Filed: Dec. 11, 2013

(65) Prior Publication Data
US 2014/0198608 A1    Jul. 17, 2014

Related U.S. Application Data

(60) Provisional application No. 61/751,523, filed on Jan. 11, 2013.

(51) Int. Cl.
G01V 1/38    (2006.01)
G01V 1/20    (2006.01)

(52) U.S. Cl.
CPC ............ *G01V 1/3817* (2013.01); *G01V 1/201* (2013.01); *G01V 1/3861* (2013.01)

(58) Field of Classification Search
CPC .. G01V 1/3817; G01V 1/3843; G01V 1/3808; G01V 1/201; G01V 1/3861
See application file for complete search history.

(56) References Cited

U.S. PATENT DOCUMENTS

| | | | |
|---|---|---|---|
| 3,491,848 A | 1/1970 | Giles | |
| 5,432,757 A | 7/1995 | Chelminski | |
| 7,167,412 B2* | 1/2007 | Tenghamn | B63B 21/66 114/246 |
| 2008/0019214 A1 | 1/2008 | Pramik | |
| 2010/0002538 A1 | 1/2010 | Frivik et al. | |
| 2010/0170428 A1* | 7/2010 | Toennessen | B63B 21/66 114/249 |
| 2011/0286303 A1* | 11/2011 | Paull | G01V 1/3808 367/20 |
| 2012/0287752 A1 | 11/2012 | Payen et al. | |

FOREIGN PATENT DOCUMENTS

GB        2 148 503 A    5/1985

OTHER PUBLICATIONS

Extended European Search Report in corresponding European Application No. EP 14 15 0660 dated Mar. 23, 2017.
Examination Report No. 1 in corresponding Australian Application No. 2014200050 dated Apr. 6, 2017.

* cited by examiner

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

A depth-varying marine acoustic source array is configured for generating an acoustic wave in a body of water. The depth-varying marine acoustic source array includes a float; plural source points connected to the float through corresponding cables; and a housing extending from a first source point to a last source point, the housing including plural segments. The at least one segment is configured to withstand bending.

18 Claims, 11 Drawing Sheets

MULTI-LEVEL SEISMIC SOURCE AND METHOD

BACKGROUND

Technical Field

Embodiments of the subject matter disclosed herein generally relate to methods and systems related to seismic exploration and, more particularly, to mechanisms and techniques for providing a seismic source having bending parts so that it can achieve various depth levels.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of structures under the seafloor is an ongoing process.

During a seismic gathering process, as shown in FIG. 1, a vessel 10 tows an array of seismic receivers 11 provided on streamers 12. The streamers may be disposed horizontally, i.e., lying at a constant depth relative to the ocean surface 14, or may have spatial arrangements other than horizontal, e.g., variable-depth arrangement. The vessel 10 also tows a seismic source array 16 configured to generate a seismic wave 18. The seismic wave 18 propagates downward, toward the seafloor 20, and penetrates the seafloor until, eventually, a reflecting structure 22 (reflector) reflects the seismic wave. The reflected seismic wave 24 propagates upward until it is detected by receiver 11 on streamer 12. Based on this data, an image of the subsurface is generated.

In an effort to improve the resolution of the subsurface's image, an innovative solution (BroadSeis system of CGG-Veritas, Massy, France) has been implemented based on broadband seismic data. The BroadSeis system may use Sentinel streamers (produced by Sercel, Nantes, France) with low noise characteristics and the ability to deploy the streamers in configurations allowing the recording of an extra octave or more of low frequencies. The streamers are designed to record seismic data while being towed at greater depths and are quieter than other streamers. Thus, the receivers of these streamers are best used with a marine broadband source array.

A marine broadband source array may include one or more sub-arrays (usually three sub-arrays), and each sub-array may include plural source points (e.g., an air gun or a cluster, association of several air guns, etc.) provided along a Y direction as shown in FIG. 2. This source array 50 has better characteristics than existing source arrays and it is disclosed in patent application Ser. No. 13/468,589, filed on May 10, 2012, and assigned to the same assignee as the present application, the entire disclosure of which is incorporated herein by reference. The source array 50 may include three different sub-arrays 60a-c, each having a corresponding float 52a-c, respectively. From each float a plurality of source points 64 is suspended. However, different from the existing sources, note that source points 64 are suspended, from the same float, at two different depths, and the configuration of the source points attached to one float may be different from the configuration of the source points attached to another float. For example, FIG. 2 shows that sub-array 60a has the deeper source point behind the shallow source points along direction Y, while sub-array 60c has the deeper source point between the shallow source points along the Y direction.

However, to produce a seismic source as illustrated in FIG. 2 has its own challenges as explained next. A traditional source array 100 is illustrated in FIG. 3 and includes a float 102 from which multiple plates 104 are suspended at a given depth. The float 102 has a body that extends along a longitudinal axis (X). Cables 106 may be used to suspend the plates 104 from the float 102. Plural source points 108a to 108e form the given depth sub-array set 108. All these source points are suspended from the same float 102 via links 112 that substantially extend along a vertical axis (Z). The link 112 may include a chain, a rope and/or a cable. Each source point may have its own cables 114 (electrical, compressed air, data, etc.) for controlling and activating the source point (note that these cables are not shown for all the sources). The cables are protected by a rigid housing 115. Strength members 110 may be located between the plates 104 for maintaining the source's integrity when towed underwater.

Some of the source points may optionally be connected to each other by various means 116, e.g., rods, chains, cables, etc. A front portion of the plate 104 corresponding to the first source point 108e and its air gun may also be connected via a connection 118 to an umbilical 120 that may be connected to the vessel (not shown). Optionally, a link 122 may connect the float 102 to the umbilical 120. In one application, three or more such floats 102 and corresponding source points may form the source array 100.

For this same-depth source array, the housing 115 and the strength members 110 are substantially parallel to the float. However, if the source array 100 is configured to have source points 108a-e at different depths, as shown in FIG. 2, then a great amount of stress is exerted on those portions of the housing 115 and strength members 110 that make the transition from the shallow depth to the deep depth of the source array. In this case, those portions of the housing 115 may break or prevent the source points from achieving a desired depth. Thus, various modifications to the housing 115 need to be made in practice. However, any modification is disruptive because it requires research, feasibility studies, etc., and takes time to be implemented.

Therefore, it is desired to produce a new source array that overcomes these problems and achieves strong low-frequency energy, a smooth spectrum, and a reduced number of high-frequency ghost notches. In addition, it is desired that such a source can be easily changed from a first configuration (e.g., same depth for the source points) to a second configuration (e.g., different depths for the source points).

SUMMARY

According to one exemplary embodiment, there is a depth-varying marine acoustic source array for generating an acoustic wave in a body of water. The depth-varying marine acoustic source array includes a float; plural source points connected to the float through corresponding cables; and a housing extending from a first source point to a last source point, the housing including plural segments. At least one segment is made of a flexible material to withstand bending.

According to another exemplary embodiment, there is a seismic survey system for generating seismic waves. The system includes a depth-varying marine acoustic source array for generating the seismic waves in a body of water; and a vessel for towing the source array. The depth-varying marine acoustic source array is similar to the source array discussed in the paragraph above.

According to still another exemplary embodiment, there is a method for deploying a seismic source array for a seismic survey. The method includes a step of deploying the source array into water, wherein the source array includes a float, plural source points connected to the float through corresponding cables, and a housing extending from a first source point to a last source point, the housing including plural segments; a step of changing a first depth of at least one source point to have a second depth while a first sub-set of the plural source points maintain the first depth; and a step of bending at least one segment of the housing when changing its depth. The at least one segment is made of a flexible material to withstand bending.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a variable-depth source array being towed by a vessel. However, the embodiments to be discussed next are not limited to variable-depth source arrays, but may be applied to other seismic sources that have the source points distributed at plural depths, slanted or otherwise.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
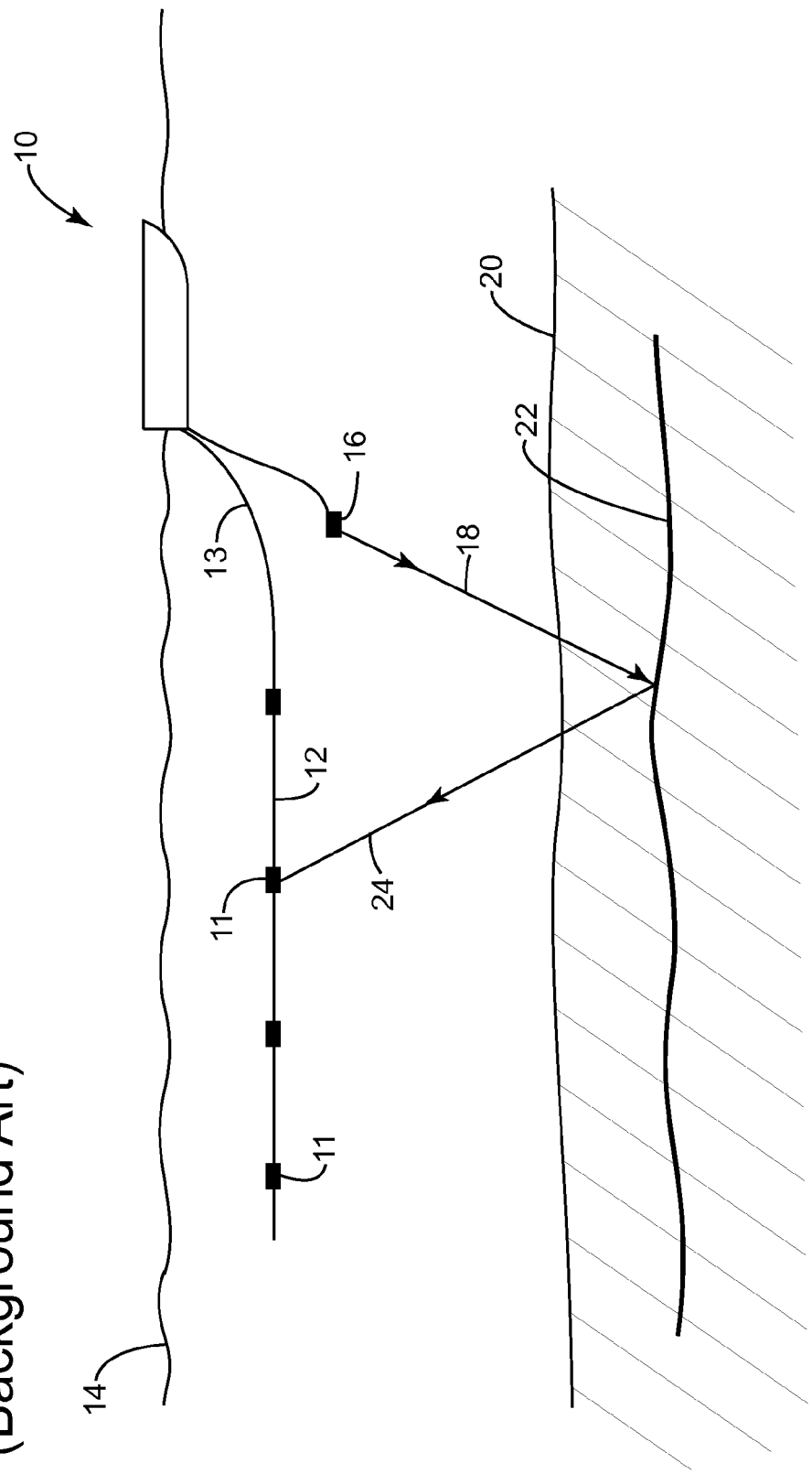
FIG. 1 is a schematic diagram of a conventional seismic survey system.
Figure 2:
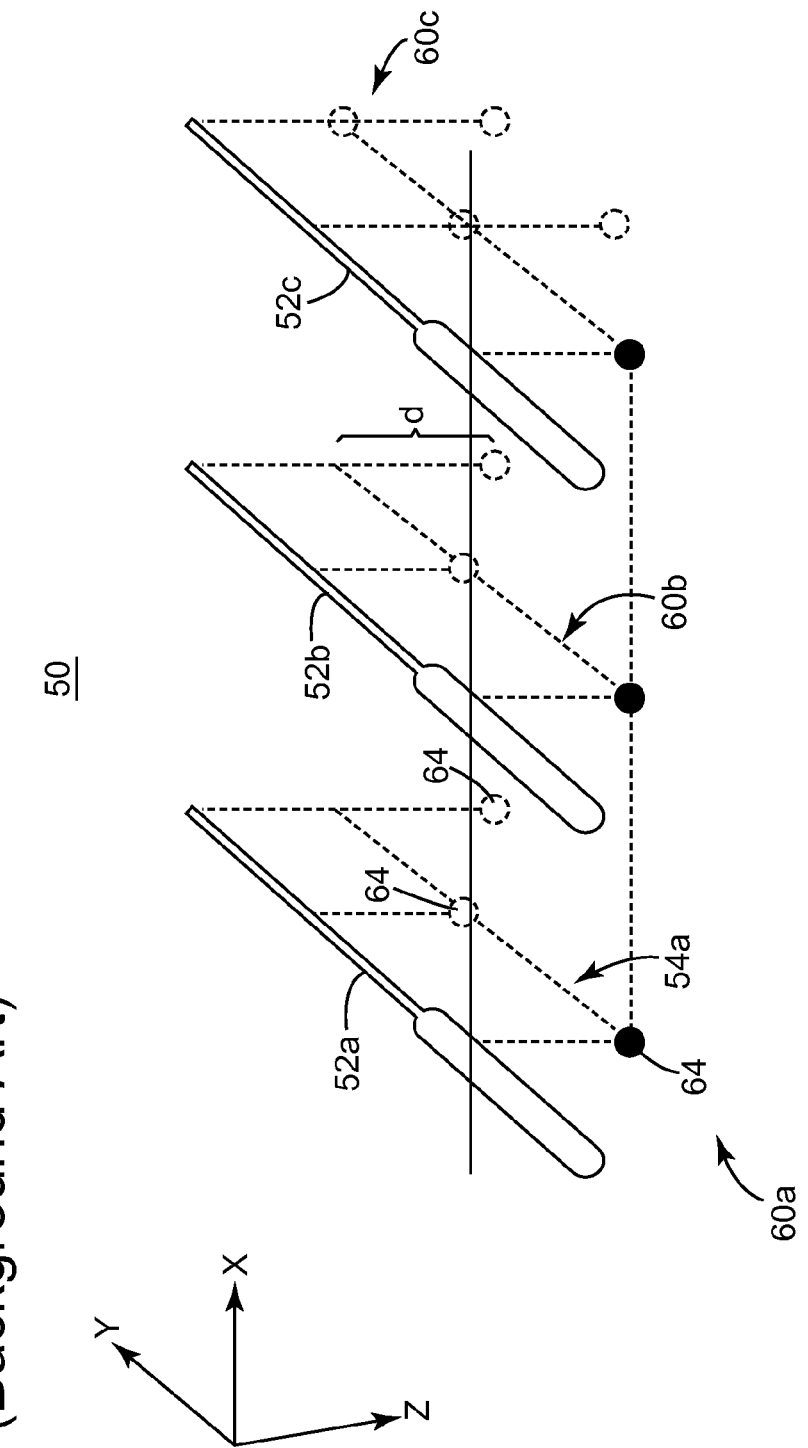
FIG. 2 is an overall view of plural floats, each having two sets of sources distributed at two different depths.
Figure 3:
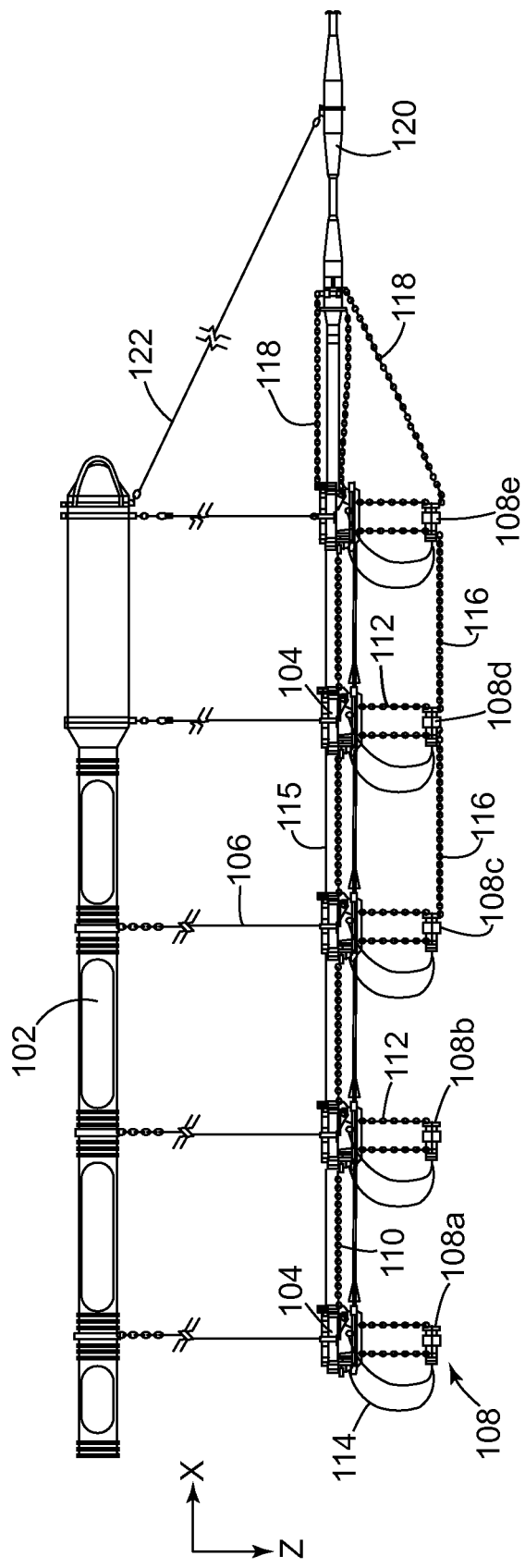
FIG. 3 is a schematic diagram of a traditional seismic survey source array.
Figure 4:
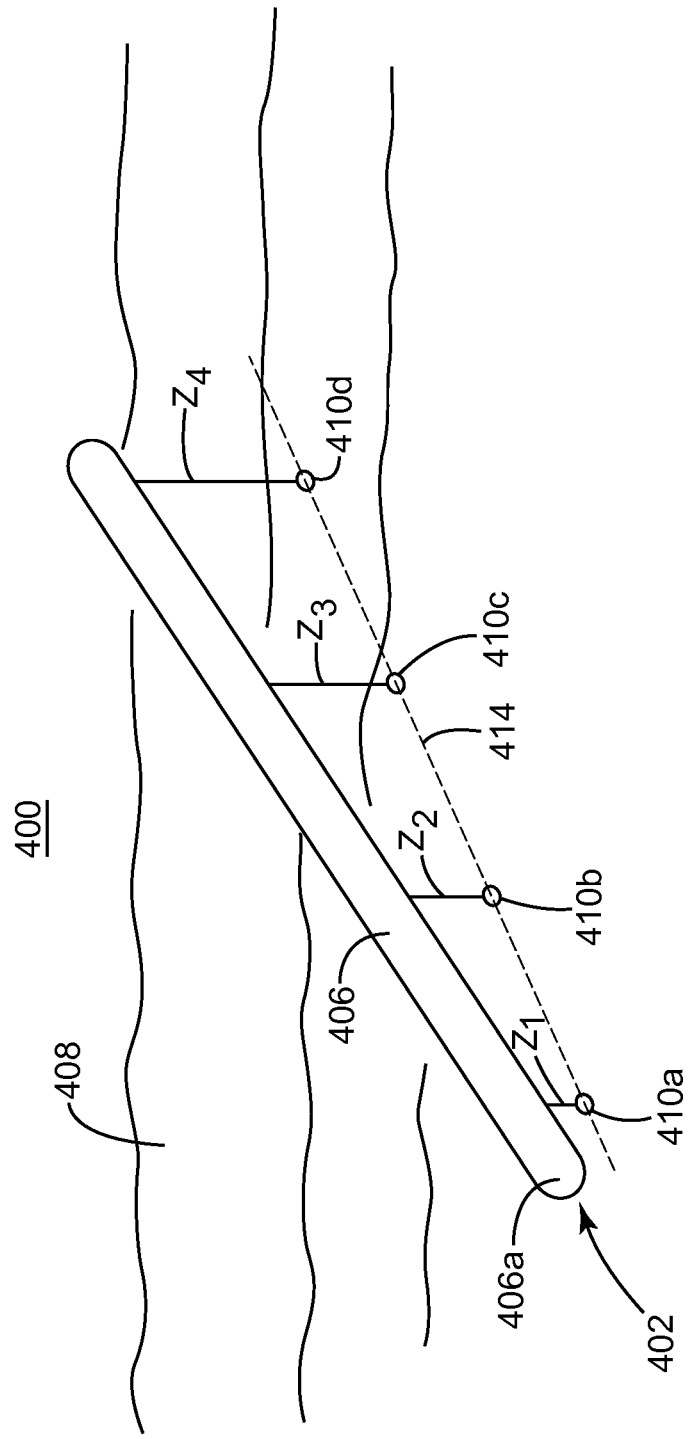
FIG. 4 is a schematic diagram of a source array having source points distributed at different depths.

Emerging technologies in marine seismic surveys need a source array that achieves good gun volume diversity, smooth spectrum, strong low-frequency spectrum, and superior suppression of notches. Such a source array was developed by the assignee of the present invention, and it is schematically illustrated in FIG. 4 as source array 400. The source array may include at least one first sub-array 402.

The first sub-array 402 has a float 406 configured to float at the water surface 408 or underwater at a predetermined depth. Plural source points 410$a$-$d$ are suspended from the float 406 in a known manner. A first source point 410$a$ may be suspended closest to the head 406$a$ of the float 406, at a first depth z1. A second source point 410$b$ may be suspended next, at a second depth z2, different from z1. A third source point 410$c$ may be suspended next, at a third depth z3, different from z1 and z2, and so on. FIG. 4 shows, for simplicity, only four source points 410$a$-$d$, but an actual implementation may have any desired number of source points. In one application, because the source points are distributed at different depths, they are not simultaneously activated. In other words, the source array is synchronized, i.e., a deeper source point is activated later in time (e.g., 2 ms for 3 m depth difference when the speed of sound in water is 1500 m/s) such that corresponding sound signals produced by plural source points coalesce, and thus, the overall sound signal produced by the source array appears to be a single sound signal.

The depths z1 to z4 of the source points of the first sub-array 402 may obey various relationships. In one application, the depths of the source points increase from the head toward the tail of the float, i.e., z1<z2<z3<z4. In another application, the depths of the source points decrease from the head to the tail of the float. In another application, the source points are slanted, i.e., provided on an imaginary line 414. In still another application, the line 414 is straight. In yet another application, the line 414 is curved, e.g., part of a parabola, circle, hyperbola, etc. In one application, the depth of the first source point for the sub-array 402 is about 5 m and the greatest depth of the last source point is about 8 m. In a variation of this embodiment, the depth range is between 8.5 and 10.5 m or between 11 and 14 m. In another variation of this embodiment, when the line 414 is straight, the depths of the source points increase by 0.5 m from one source point to an adjacent source point. Those skilled in the art would recognize that these ranges are exemplary and these numbers may vary from survey to survey. A common feature of all these embodiments is that the source points have variable depths so that a single sub-array exhibits multiple-level source points.

Figure 5:
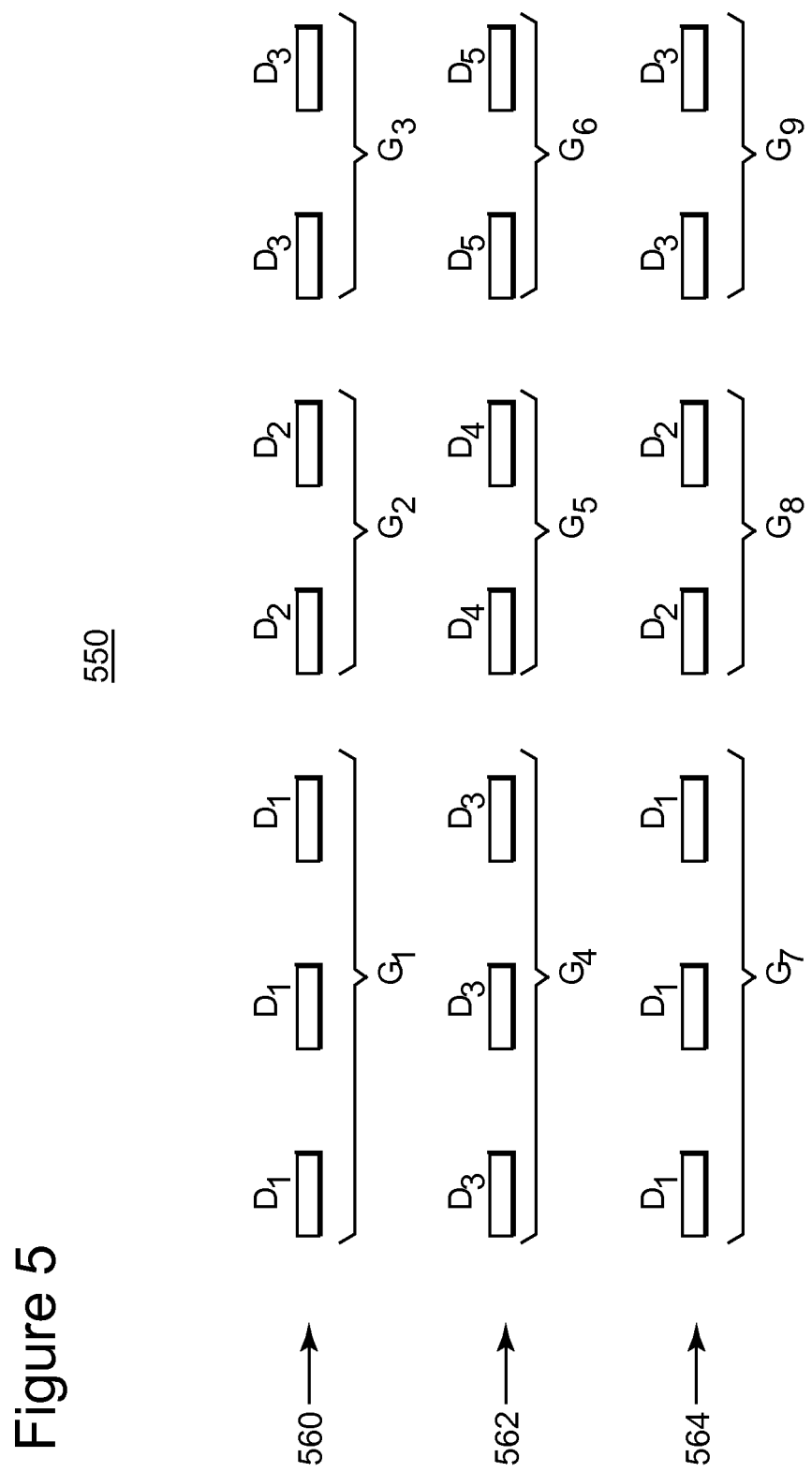
FIG. 5 is a schematic diagram of a source array having groups of source points distributed at different depths.
Figure 6:
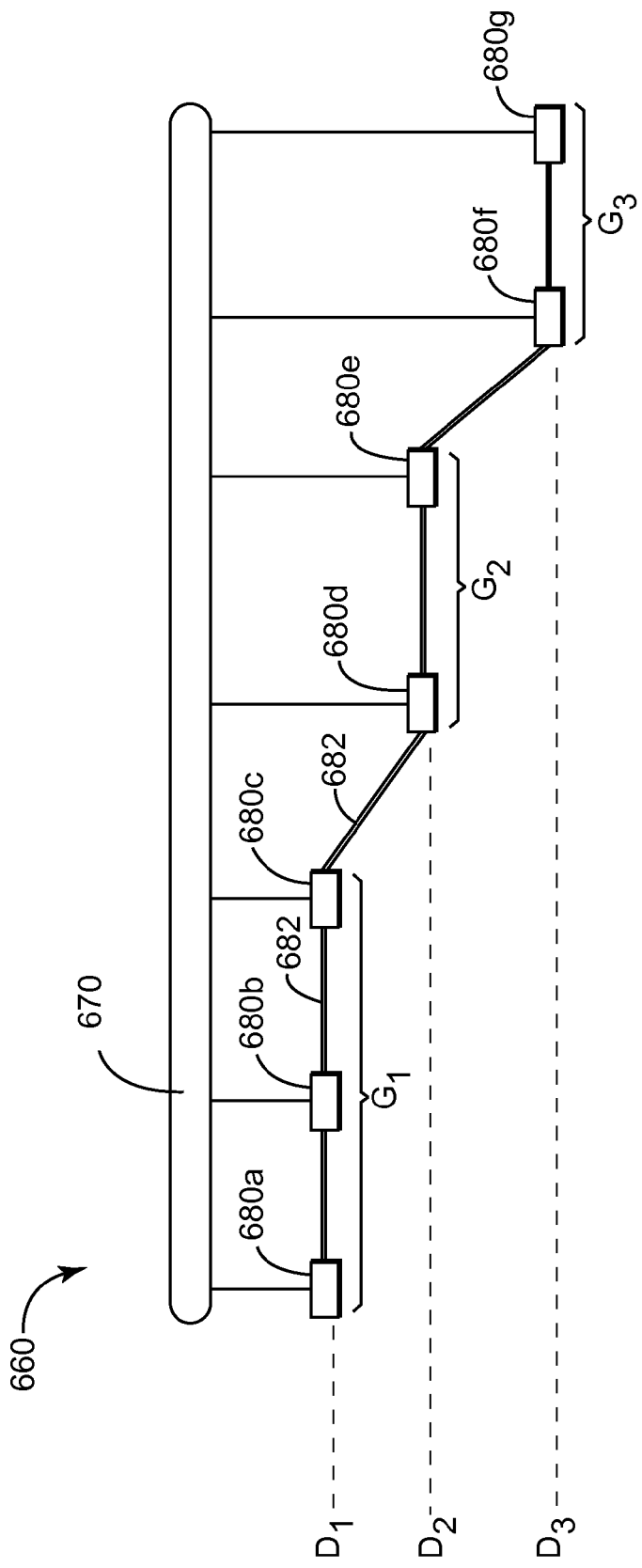
FIG. 6 is a side view of the source array of FIG. 5.

According to another exemplary embodiment, illustrated in FIGS. 5 and 6, the source points do not follow the imaginary line 514, but rather groups of source points follow this line. FIG. 5 is a top view of an exemplary source 550 that has three sub-arrays 560, 562 and 564. The source points for each sub-array are in groups G1 to G9, with each group including at least one source point. The groups are distributed at different depths, e.g., D1 to D5. A side view of the first sub-array 560 is shown in FIG. 6, and this view illustrates that each group is provided at a given depth and there is a step increase (or other increase) from one group to the next group. For example, the increase may follow, as discussed above, a straight line or a curve (e.g., parabola, circle, hyperbola, etc.). Two or more sub-arrays may have the same depth distribution for the source points. FIG. 6 shows the first sub-array 660 including a float 670 and at least seven source points 680*a* to 680*g*. Umbilicals 682 connect adjacent source points for providing power, data and/or compressed air as necessary for operation of the devices making up the source points.

By having many depth levels for the source points of the source array, over an extended ratio of depths (e.g., 2.5:1), the novel source array can achieve strong low-frequency energy, a smooth spectrum, and be almost free of high-frequency ghost notches. As previously noted, a source point may include an air gun. Other types of marine sources (e.g., water gun, vibratory source, etc.) may be used instead. Also, the embodiments illustrated in FIGS. 5 and 6 are exemplary. This means that many other configurations may be envisioned to achieve source point depth diversity. For example, one sub-array may have source points distributed deeper as the distance from the head of the float increases, while a next sub-array has source points distributed deeper as the distance from the tail of the float increases. Further, the number of source points connected to one float may vary. Furthermore, a source point may include one or more guns.

Figure 7:
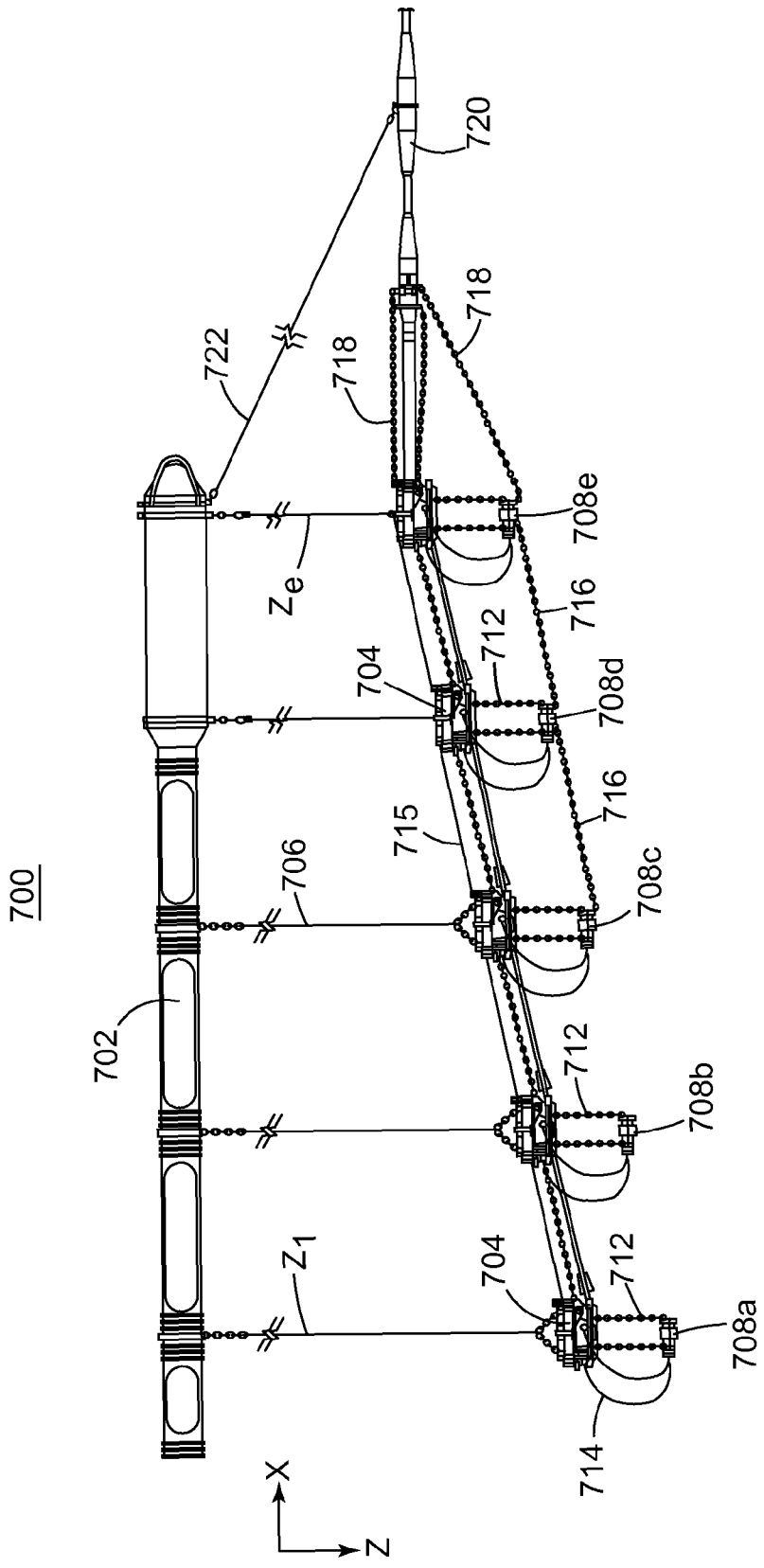
FIG. 7 is a side view of a source array having source points distributed on a slanted line.

In another exemplary embodiment illustrated in FIG. 7, the links among the source points and the connections to the towing vessel (not shown) are illustrated. The source array 700 includes at least one float and corresponding source points. However, the source array 700 may include plural sub-arrays, each sub-array including a float and corresponding source points. For simplicity, FIG. 7 shows the source array having a single sub-array. Thus, the source array 700 has a float 702 from which multiple plates 704 are suspended at given depths, e.g., z1 to ze. In one application, there is a plate 704 for each source point. The float 702 has a body that extends along a longitudinal axis (X). Although the exemplary embodiments discussed herein show a straight-line float, note that other shapes may be used for the float, e.g., circle, ellipse, etc. Cables 706 may be used to suspend the plates 704 from the float 702. Plural air guns (or vibratory sources) 708*a* to 708*e* form the first sub-array. The air guns are suspended from corresponding plates 704 via links 712 that substantially extend on a vertical axis (Z). Each source point may have its own cables 714 (electrical, compressed air, data, etc.) for controlling and activating the air gun. The cables may be protected by a housing 715. In order to achieve the slanted profile (or another profile) shown in FIG. 7, the length of the cables 706 needs to be adjusted. In one application, the length of the housing 715 stays substantially the same when the depths of the source points are adjusted, which makes implementation of this method in the field easier.

As will be recognized by those skilled in the art, the connections between the plates 704 and air guns 708*a-e*, and also among the various source points, are difficult to modify and/or change while deployed underwater. Thus, in one embodiment, the variable-depth source modifies the length of the cables 706 and/or the chains 712 to achieve the desired profile, and not the other links or cables.

One issue common to all the configurations illustrated in the previous figures is the fact that the housing 715 is not prone to bending (the housing, also called "mud hose," could be slightly bent but this is not an appropriate use because this use leads to quick damages and fatigue). This is a major limitation of existing source arrays because the housing needs to be bent when changing the depth of various source points.

Figure 8:
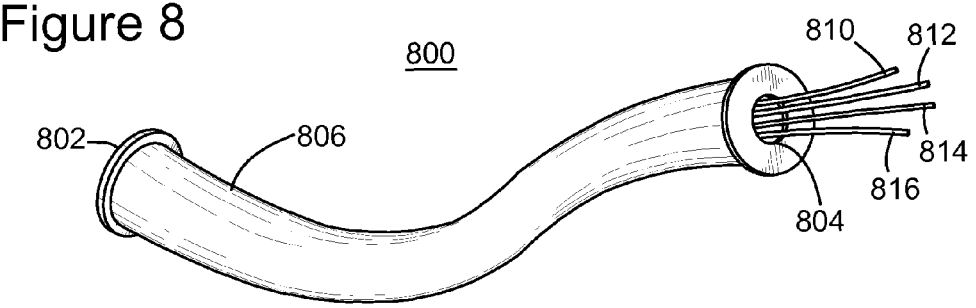
FIG. 8 is a schematic diagram of a bending segment that is part of a seismic source array according to an exemplary embodiment.

According to an exemplary embodiment illustrated in FIG. 8, a bending part 800 of the housing is made of a flexible material, e.g., plastic, polymer, metal rubber, metal having a bellows structure, etc. The bending part 800 of housing may have a cylindrical shape and can achieve a small radius of curvature, i.e., it can bend substantially. Note that this housing bending part 800 has two ends 802 and 804 (ends 802 and 804 may include parts that allow the mounting of the bending part on the gun hanging plates; they could be bolted, clamped, etc.) and a body 806 that extends between the two openings. The body 806 houses and protects the power cable 810, data cable 812, pneumatic hose 814 and/or strength member 816. In one exemplary embodiment, the strength member 816 is located outside the housing bending part 800. In another exemplary embodiment, a single cable is used for both power and data. In yet another exemplary embodiment, strength functionality is provided by the bending part 800 itself, i.e., there is no other strength member.

Figure 9:
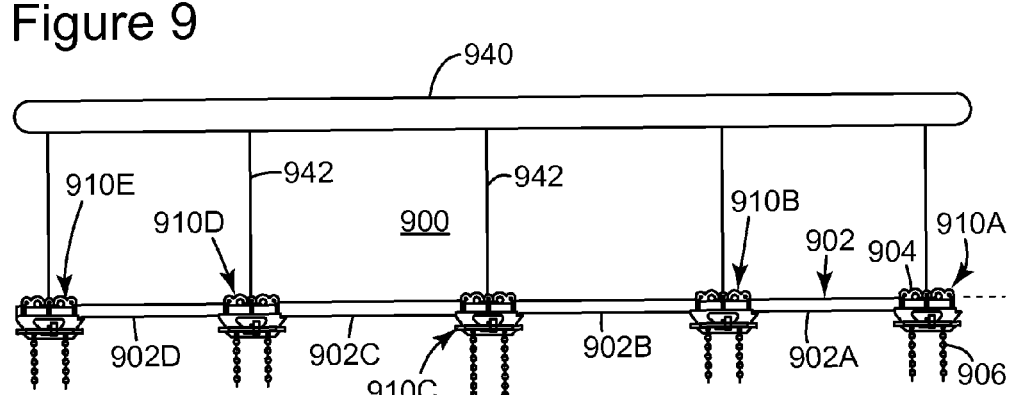
FIGS. 9 and 10 are schematic diagrams of a seismic source array that can be configured to have different depths according to an exemplary embodiment.

FIG. 9 shows such a novel source array 900 having the housing 902 extending from the first source point 910A to the last source point 910E. The source of FIG. 9 shows five source points. However, fewer or more source points may be attached to a single float. A source point 910C may include a plate 904 attached to the float 940 and from which air gun 915C (only one is shown for simplicity) is suspended through at least one chain 906 (this will mainly be done in order to have a smoother slope of the housing, also called "sub-harness" in the art). The electric and data cables and the compressed air hose connected to the air gun are not shown in this figure (however, these cables are illustrated in FIG. 8). The housing (which may have the function of tow member) 902 may be made from multiple segments 902A to 902D, each segment being connected between two adjacent plates 904. At least one segment may have the configuration and composition discussed with regard to the bending part 800 in FIG. 8. FIG. 9 shows that both segments 902B and 902C have the flexibility of the bending part 800. FIG. 9 also shows a float 940 from which the plates 904 are connected, e.g., with chains 942.

Figure 10:
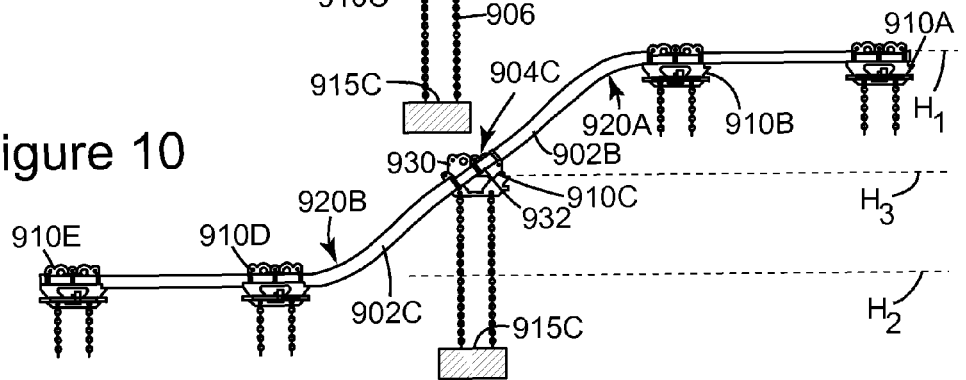

As shown in FIG. 10, when the source points 910E and 910D are lowered from depth H1 to depth H2, the flexible segments 902B and 902C bend, especially at regions 920A and 920B accordingly. Note that a traditional segment of the housing is not designed to stand such bending, resulting in fractures at regions 920A and 920B, and thus compromising the housing's integrity. The plate 904C of the source point 910C may be designed to have a fixed part 930 suspended from the float 940 and a rotating part 932 that pivots relative to the fixed part 930 and directly connects to the bending segments 902B and 902C. This configuration of a fixed part and a rotating part may be implemented for more or all the source points. Thus, in one application, the rotating and fixed parts may be added to the source points 910B and 910D to reduce a bending condition of the ends of bending parts 902B and 902C. Thus, the regions of the bending segments 902B and 902C proximal to the plate 904C do not have to bend (or have a limited/defined bending radius) when the source points of the source array 900 take different depths.

FIG. 10 illustrates a source array having source points distributed at three different depths. A first sub-set of source points are located at depth H1, a second sub-set of source points are located at depth H2, and the intermediate source point 910C is positioned at a third depth H3. The intermediate source point 910C may be part of a third sub-set of source points. Fewer or more depths may be implemented for the novel source array. Thus, the source array may be configured to be in a first state (e.g., in which all the source points are at a same depth from the float as shown in FIG.

9) and in a second state (e.g., in which the source points are distributed at two different depths relative to the float). The first state may be a storing state and the second state may be a deployed state. More states may be implemented, e.g., a third state in which one sub-set of source points is at a first depth, another sub-set of source points is at a second depth, and still another sub-set of source points is at a third depth. The number of source points in any of the sub-sets may be one or more.

Figure 11A:
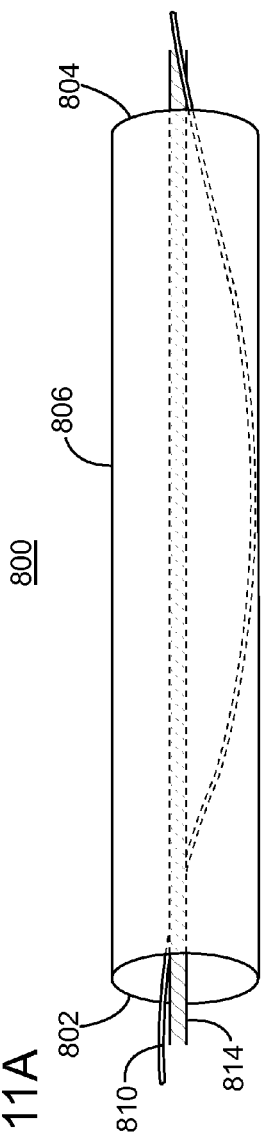
FIGS. 11A and 11B are schematic diagrams of a bending part of a seismic source array according to an exemplary embodiment.
Figure 11B:
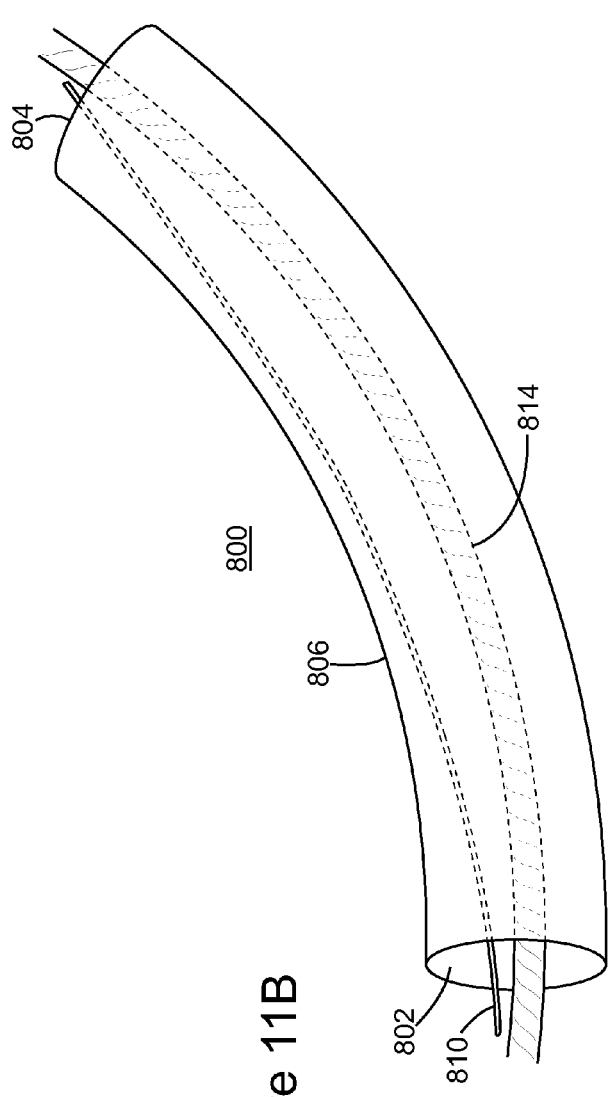

Because the bending part 800 needs to be elastic to bend as necessary, the inside components, i.e., the power, data and compressed air members, need to also exhibit the same functionality. While the compressed air hose 814 is inherently elastic, the same may not be said about the power and/or data cables. Thus, in one exemplary embodiment, as illustrated in FIG. 11A, the power cable 810 (the same is true for the data cable if present, but it is not shown for simplicity) may have a length longer than the body 806 of the bending part 800 so that its length can vary as the body 806 increases or decreases its length as illustrated in FIG. 11 B. In other words, the power cable may be provided with stock to allow a limited length change.

The above described novel embodiments have the advantage that no other technical modifications need to be implemented to the vessel and/or seismic source array when storing the source on the deck (configuration illustrated in FIG. 9) of the vessel and adjusting the depths of the source points when deployed (configuration illustrated in FIG. 10).

Figure 12:
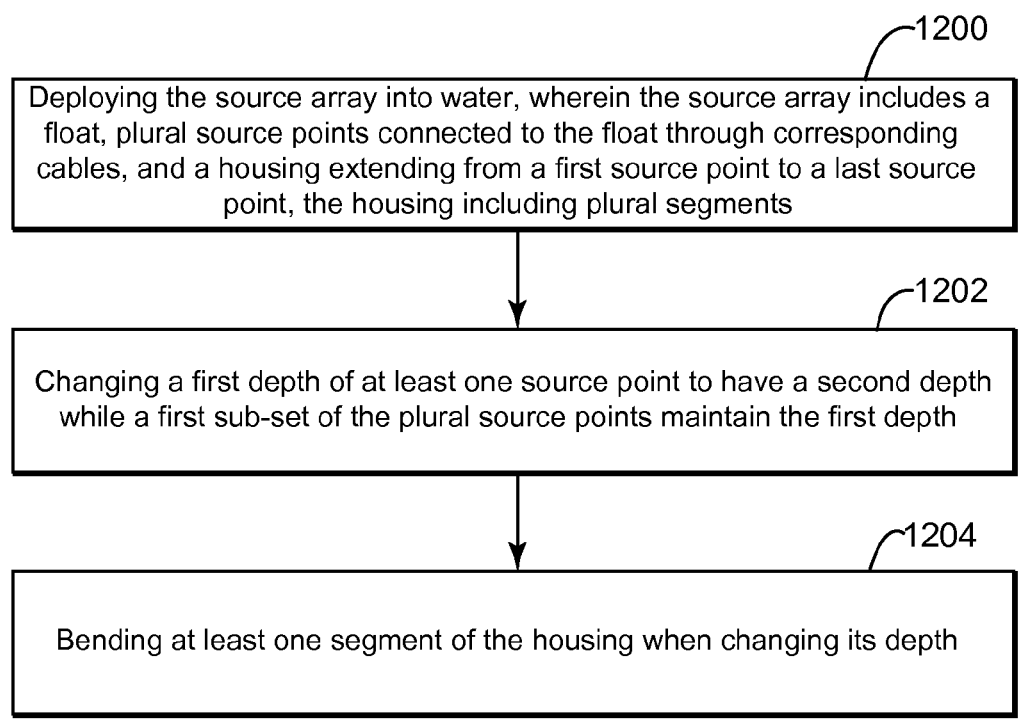
FIG. 12 is a flowchart of a method for deploying a seismic source array according to an exemplary embodiment.

According to an exemplary embodiment illustrated in FIG. 12, there is a method for deploying a seismic source array for a seismic survey. The method includes a step 1200 of deploying the source array into water, wherein the source array includes a float, plural source points connected to the float through corresponding cables, and a housing extending from a first source point to a last source point, the housing including plural segments; a step 1202 of changing the first depth of at least one source point to have a second depth while a first sub-set of the plural source points maintain the first depth; and a step 1204 of bending at least one segment of the housing when changing its depth. At least one segment is made of a flexible material to withstand bending while other segments are inflexible.

The above embodiments were discussed without specifying what type of seismic receiver is used to record the seismic data. In this sense, it is known in the art to use, for a marine seismic survey, streamers that are towed by one or more vessels, and the streamers include the seismic receivers. The streamers may be horizontal, slanted or have a curved profile as illustrated in FIG. 13.

Figure 13:
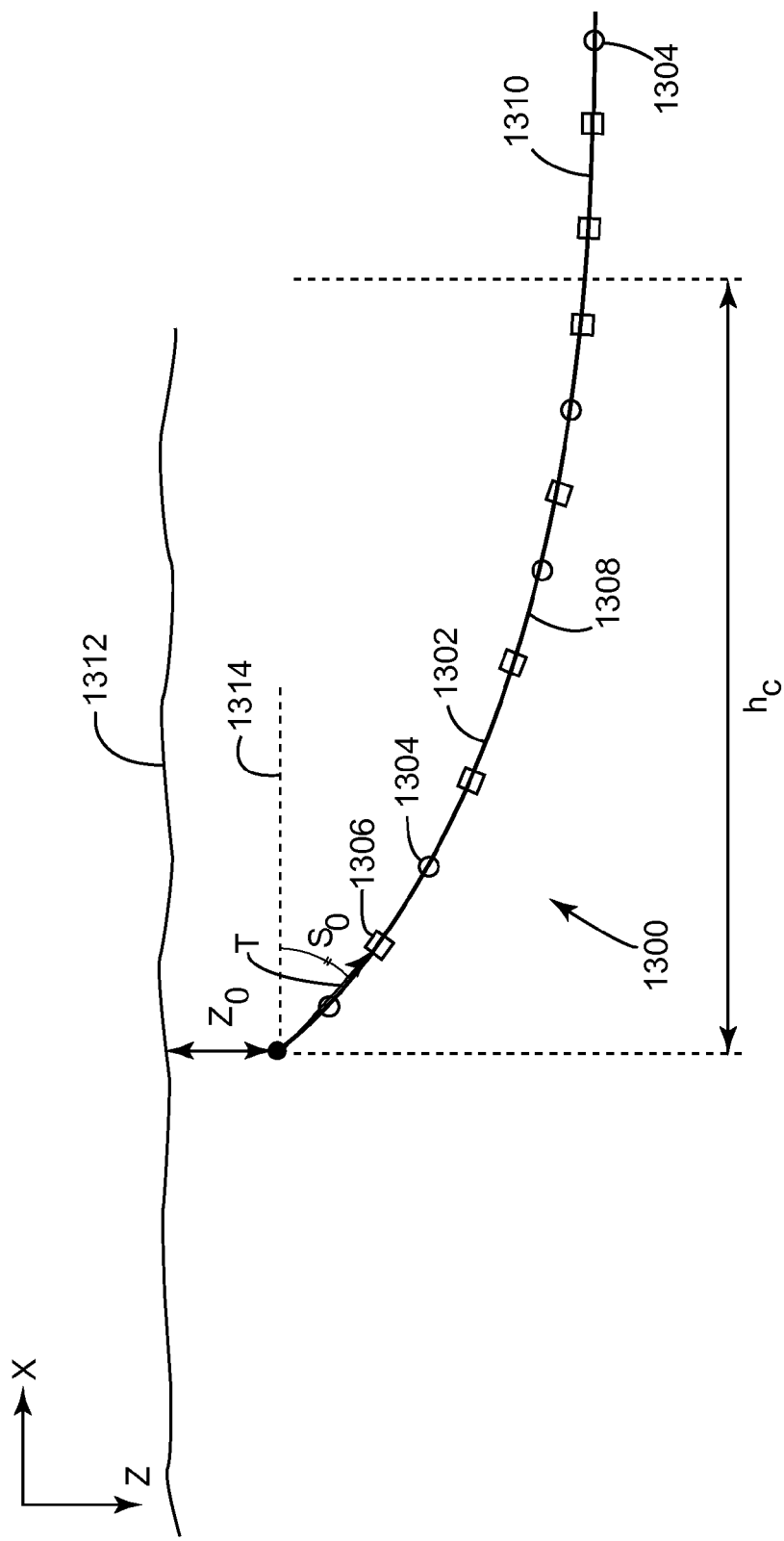
FIG. 13 is a schematic diagram of a curved streamer that may be used together with a source array.

The curved streamer 1300 of FIG. 13 includes a body 1302 having a predetermined length, plural detectors 1304 provided along the body, and plural birds 1306 provided along the body for maintaining the selected curved profile. The streamer is configured to flow underwater when towed such that the plural detectors are distributed along the curved profile. The curved profile may be described by a parameterized curve, e.g., a curve described by (i) a depth $z_0$ of a first detector (measured from the water surface 1312), (ii) a slope $s_0$ of a first portion T of the body with an axis 1314 parallel with the water surface 1312, and (iii) a predetermined horizontal distance $h_c$ between the first detector and an end of the curved profile. Note that the entire streamer does not have to have the curved profile. In other words, the curved profile should not be construed to always apply to the entire length of the streamer. While this situation is possible, the curved profile may be applied only to a portion 1308 of the streamer. In other words, the streamer may have (i) only a portion 1308 with the curved profile or (ii) a portion 1308 with the curved profile and a portion 1310 with a flat profile, with the two portions attached to each other.

One or more of the exemplary embodiments discussed above produces a better broadband source array while the source array suppresses notches in the amplitude spectrum by having individual source points provided at different depths relative to the surface of the water or the float. Further, existing floats may be used for the novel source array with minimal modifications. Existing floats do not have to be straight floats, but may be of other types as known in the art, e.g., floats used with the fan source or tower source or flexible floats. Because the depths of the source points may be adjusted during the seismic survey, manually or automatically, the survey can be better tailored to the specific conditions of the subsurface.

The disclosed exemplary embodiments provide a system and a method for providing an adjustable-depth source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A depth-varying marine acoustic source array for generating an acoustic wave in a body of water, the depth-varying marine acoustic source array comprising:
   a float;
   plural source points connected along the float through corresponding cables, a source point including a plate, a source element, and a chain that connects the plate to the source element; and
   a housing including plural segments, at least one segment being connected between corresponding plates of at least two sub-sets of the source points and enclosing operating cables,
   wherein the corresponding plates are located at a same depth during a first state and at different depths relative to the float during a second state, and
   wherein the at least one segment being configured to bend during the second state to accommodate the at least two sub-sets of the source points when arranged at the different depths.

2. The source array of claim 1, wherein the at least one segment is made of a flexible material or has a bellows structure.

3. The source array of claim 1, wherein each source point is initially deployed at a same depth.

4. The source array of claim 1, wherein the at least two sub-sets include a first sub-set that has first plates at a first depth and a second sub-set that has second plates at a second depth, different from the first depth.

5. The source array of claim 4, wherein the plural source points further include an intermediate source point that is not part of the first sub-set neither the second sub-set, and the intermediate source point has a third plate that is at a third depth different from the first and second depths.

6. The source array of claim 1, wherein an intermediate source point comprises:
a fixed part that is attached to the float;
a rotating part attached to the fixed part and configured to pivot about the fixed part; and
a gun connected to the fixed part.

7. The source array of claim 6, wherein the at least one segment is connected to the rotating part.

8. The source array of claim 1, wherein the operating cables include:
a power cable; and
a compressed air hose.

9. The source array of claim 1, wherein the housing acts as a strength member when the source points are towed underwater.

10. The source array of claim 1, wherein the plural source points include at least three sub-sets, a first sub-set that has all first plates of its source points at a first depth, a second sub-set that has all second plates of its source points at a second depth different from the first depth, and a third sub-set that has all third plates of its source points at a third depth, different from the first and second depths, and
wherein the second sub-set includes a single source point, and the at least one segment includes first and second segments, both the first and second segments are connected to the single source point, the first segment is also connected to a source point of the first sub-set, the second segment is also connected to a source of the third sub-set, and the first and second segments are bent.

11. A seismic survey system for generating seismic waves, the system comprising:
a depth-varying marine acoustic source array for generating the seismic waves in a body of water; and
a streamer having plural seismic sensors for recording seismic signals associated with the seismic waves,
wherein the depth-varying marine acoustic source array includes,
a float,
plural source points connected along the float through corresponding cables, a source point including a plate, a source element and a chain that connects the plate to the source element; and
a housing including plural segments, at least one segment being connected between corresponding plates of at least two sub-sets of the source points and enclosing operating cables,
wherein the corresponding plates are located at a same depth during a first state and at different depths relative to the float during a second state, and
wherein the at least one segment being configured to bend during the second state to accommodate the at least two sub-sets of the source points when arranged at the different depths.

12. The system of claim 11, wherein the at least one segment is made of a flexible material or has a bellows structure.

13. The system of claim 11, wherein each source point is initially deployed at a same depth.

14. The system of claim 11, wherein the at least two sub-sets include a first sub-set that has first plates at a first depth and a second sub-set that has second plates at a second depth, different from the first depth, and the plural source points further include an intermediate source point that is not part of the first sub-set neither the second sub-set, and the intermediate source point has a third plate that is at a third depth different from the first and second depths.

15. The system of claim 11, wherein an intermediate source point comprises:
a fixed part that is attached to the float;
a rotating part attached to the fixed part and configured to pivot about the fixed part; and
a gun connected to the fixed part.

16. The system of claim 15, wherein the at least one segment is connected to the rotating part.

17. The system of claim 11, wherein the housing acts as a strength member, and the operating cables include:
a power cable; and
a compressed air hose.

18. The system of claim 11, wherein the plural source points include at least three sub-sets, a first sub-set that has all first plates of its source points at a first depth, a second sub-set that has all second plates of its source points at a second depth different from the first depth, and a third sub-set that has all third plates of its source points at a third depth, different from the first and second depths, and
wherein the second sub-set includes a single source point, and the at least one segment includes first and second segments, both the first and second segments are connected to the single source point, the first segment is also connected to a source point of the first sub-set, the second segment is also connected to a source of the third sub-set, and the first and second segments are bent.

* * * * *